(12) United States Patent
Lette et al.

(10) Patent No.: US 7,260,633 B2
(45) Date of Patent: Aug. 21, 2007

(54) SYSTEM AND METHOD FOR PROCESSING REQUESTS FROM NEWLY REGISTERED REMOTE APPLICATION CONSUMERS

(75) Inventors: John T. Lette, Issaquah, WA (US);
Ram Viswanathan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 965 days.

(21) Appl. No.: 09/770,056

(22) Filed: Jan. 25, 2001

(65) Prior Publication Data
US 2003/0018784 A1 Jan. 23, 2003

(51) Int. Cl.
| | |
|---|---|
| G06F 15/173 | (2006.01) |
| G06F 15/16 | (2006.01) |
| G06F 7/00 | (2006.01) |
| G05B 19/418 | (2006.01) |
| H04M 3/42 | (2006.01) |
| H04M 7/00 | (2006.01) |
| H04M 1/64 | (2006.01) |

(52) U.S. Cl. .................... 709/226; 709/229; 707/10; 705/8; 379/202.01; 379/221.06; 379/88.08; 713/201

(58) Field of Classification Search ............... 709/226, 709/229; 705/8; 713/201; 719/316; 379/221.06, 379/88.08; 370/395.21
See application file for complete search history.

(56) References Cited

U.S. PATENT DOCUMENTS

| | | | | |
|---|---|---|---|---|
| 5,701,465 | A * | 12/1997 | Baugher et al. ............... 707/10 |
| 5,926,535 | A * | 7/1999 | Reynolds ............... 379/221.06 |
| 6,324,590 | B1 * | 11/2001 | Jeffords et al. ............. 719/316 |
| 6,381,579 | B1 * | 4/2002 | Gervais et al. ................. 705/8 |
| 6,401,125 | B1 * | 6/2002 | Makarios et al. ............ 709/229 |
| 6,504,913 | B1 * | 1/2003 | Patterson et al. ......... 379/88.08 |
| 6,539,481 | B1 * | 3/2003 | Takahashi et al. ........... 713/201 |
| 6,631,134 | B1 * | 10/2003 | Zadikian et al. ........ 370/395.21 |
| 7,039,714 | B1 * | 5/2006 | Blakley, III et al. ......... 709/229 |
| 2002/0071540 | A1 * | 6/2002 | Dworkin ................ 379/202.01 |

OTHER PUBLICATIONS

Park, J.S., et al.; "Secure Cookies on the Web", *IEEE Internet Computing*, vol. 4, No. 4, p. 36-44.
Ramakrishnan, R., "From Browsing to Interacting: DBMS Support for Responsive Websites", *SIGMOD Record*, vol. 29, No. 2, p. 573.
Park, J.S., et al.; "Secure Cookies on the Web", *IEEE Internet Computing*, vol. 4, No. 4, p. 36-44, date unknown.
Ramakrishnan, R., "From Browsing to Interacting: DBMS Support for Responsive Websites", *SIGMOD Record*, vol. 29, No. 2, p. 573, date unknown.

* cited by examiner

*Primary Examiner*—Bunjob Jaroenchonwant
*Assistant Examiner*—Philip Lee
(74) *Attorney, Agent, or Firm*—Amin, Turocy & Calvin, LLP

(57) ABSTRACT

A system and method for pre-allocating resources for use by registering consumers of applications and/or services available via a protocol that identifies a user through items including, but not limited to, a cookie and/or a persistent connection (e.g., the Internet) is provided. The system includes one or more components for pre-allocating resources for use by consumers registering to use applications and/or services available over the Internet. Since consumers can be served by more than one application and/or service server, and since resources can be managed by more than one resource manager, information concerning a consumer may be replicated to the more than one resource manager. The system thus includes one or more components for processing requests from consumers that require access to resources so that requests from newly registered consumers can be processed by a resource manager that has information concerning the newly registered consumers.

30 Claims, 9 Drawing Sheets

SYSTEM AND METHOD FOR PROCESSING REQUESTS FROM NEWLY REGISTERED REMOTE APPLICATION CONSUMERS

TECHNICAL FIELD

The present invention relates generally to computer programming and more particularly to a system and method for pre-allocating resources and processing resource requests.

BACKGROUND OF THE INVENTION

As more applications and/or services are provided over the Internet, it has become more common to have multiple resource managers associated with managing resources allocated to consumers of such applications and/or services. Employing multiple resource managers has become important due to the volume of consumers registering to use applications and/or services and the corresponding volume and variety of resources employed to support the consumers. Requiring resource allocation to be performed by a single resource managing component can produce problems including, but not limited to, undesired delays in registering users of applications and/or services and undesired delays in granting access to applications and/or services to newly registered users. Such delays can be caused by replication latency problems.

Conventionally, when a consumer registers to use an application and/or service provided over the Internet, the application and/or service provider (hereinafter the ASP) collects information from the consumer (e.g., name, address, payment method, domain name, username/password). The information collected can initially be stored on one resource managing component, where that managing component may be one of many components managing resources associated with supporting the application and/or service. The information collected can be employed to generate data concerning the registering consumer (e.g., a security identifier). After registration, the consumer information and/or generated data will typically be replicated to components managing the resources associated with supporting the application and/or service. Such replication may not occur immediately, which can lead to replication latency problems.

By way of illustration, when a consumer registers to use an application and/or service, the consumer may thereafter attempt to use that application and/or service. If the consumer access generates requests associated with using the application and/or service, before the consumer information and/or generated data has been replicated to the components managing the resources associated with supporting the application and/or service, then it is possible that a resource managing component will receive a request for which it has no corresponding consumer information, and thus the managing component may deny the request. This can be frustrating for a user who signed up for a service and then is denied access to the service. Such delays and denials can negatively impact the business of the ASP.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and method for pre-allocating resources to improve consumer experiences associated with registering for, and subsequently using, an application and/or service available over the Internet by reducing problems associated with resource allocation delays and replication latencies. Pre-allocated resources can be associated with one or more resource managing components that can be tasked with handling requests from a registering consumer. When a registering consumer registers to use an application and/or service, the registering consumer can be mapped to a component managing resources pre-allocated for use by registering users. Information collected from the registering consumer during the registration process can be stored in and/or by the component managing the pre-allocated resources, and can selectively be stored in a component for distinguishing requests from registering consumers. The information collected from a registering consumer can be employed to generate data associated with the registering consumer. For example, a (username, password) combination can be employed to generate a security identifier for the registering consumer. The information collected from the registering consumer during registration, and/or data associated with the registering consumer (the registration information/data), can be replicated to one or more resource managing components co-operating in managing the resources supporting the application and/or service.

Requests received from the registering consumer before the registration information/data is replicated to other components co-operating in managing the resources supporting the application and/or service for which the consumer registered can be routed to the component managing the pre-allocated resources associated with the newly registered consumer. Such routing can be achieved by examining consumer requests and determining from the request and/or from information stored in and/or by an identifying/routing component that the registration information/data associated with a consumer making a request has not yet been replicated. For example, information stored in a persistent client-side hypertext file (hereinafter "cookie") associated with a consumer can be employed to identify the consumer, and a data store can be examined to determine whether the consumer is a registering (pre-replication) consumer or a registered (post-replication) consumer. Requests from consumers whose registration information/data has not yet been replicated can thus be directed to a managing component associated with pre-replication consumer information and pre-allocated resources.

Once the registration information/data has been replicated to the one or more resource managing components co-operating in managing the resources supporting the application and/or service, the identifying/routing component can route requests from a consumer whose registration information/data has been replicated to resource managing components other than the resource managing component initially tasked with managing requests from the consumer. By way of illustration, the data store accessed by the identifying/routing component may contain a mapping to route requests from a recently registered consumer to a resource managing component tasked with handling requests from that recently registered consumer. Once the registration information/data has been replicated, such a mapping can be removed, and mappings to a plurality of resource managing components can be established, facilitating routing consumer requests to resource managing components other than the managing component tasked with handling requests from the newly registered consumer.

In accordance with an aspect of the present invention, a system for pre-allocating at least one resource is provided, the system comprising: an allocator adapted to pre-allocate the at least one resource; an identifier adapted to determine whether a consumer of the at least one resource is a registering consumer or a registered consumer; an associator adapted to associate the at least one pre-allocated resource with a first resource manager, the first resource manager operable to manage the at least one pre-allocated resource for the registering consumer; and a router adapted to route a request requiring access to the at least one resource associated with the registering consumer to the first resource manager.

Another aspect of the present invention provides a computer readable medium storing computer executable components of the system for pre-allocating the at least one resource; an identifying component for determining whether a consumer of the at least one resource is a registering consumer or a registered consumer; an associating component for associating the at least one pre-allocated resource with a first resource managing component, the first resource managing component operable to manage the at least one pre-allocated resource for the registering consumer; and a routing component for routing a request requiring access to the at least one resource associated with the registering consumer to the first resource managing component.

Yet another aspect of the present invention provides a method for processing requests from a registering consumer, comprising: pre-allocating one or more resources for one or more registering consumers; associating one or more of the pre-allocated resources with a first resource managing component, the first resource managing component operable to manage the one or more pre-allocated resources for the registering consumer; associating the registering consumer with the first resource managing component; and routing a request from the registering consumer that requires access to a resource to the first resource managing component.

Still another aspect of the present invention provides a computer readable medium storing computer executable instructions operable to execute the method for processing requests from a registering consumer, comprising: pre-allocating one or more resources for one or more registering consumers; associating one or more of the pre-allocated resources with a first resource managing component, the first resource managing component operable to manage the one or more pre-allocated resources for the registering consumer; associating the registering consumer with the first resource managing component; and routing a request from the registering consumer that requires access to a resource to the first resource managing component.

Yet another aspect of the present invention provides a data packet adapted to be transmitted between two or more computer processes, the data packet comprising: information concerning pre-allocating one or more resources for access by one or more registering consumers, the information including at least one of: a resource type; a resource name; a resource capacity; a resource location; a resource availability; an association between a resource and a resource managing component, and an association between a resource managing component and the registering consumer.

Still another aspect of the present invention provides a system for pre-allocating at least one resource, comprising: means for pre-allocating the at least one resource for consumption by a consumer; means for determining whether data concerning the consumer has been replicated to one or more resource managing components; means for associating the at least one pre-allocated resource with a first resource managing component, where the first resource managing component manages the at least one pre-allocated resource for the consumer before the data concerning the consumer has been replicated to the one or more resource managing components; and means for routing a request generated by the consumer, for whom data has not been replicated to the one or more resource managing components, to the first resource managing component.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents Other advantages and novel features of the invention may become apparent from the following detailed description of the invention when considered in conjunction with the drawings.

DETAILED DESCRIPTION OF THE INVENTION

Figure 1:
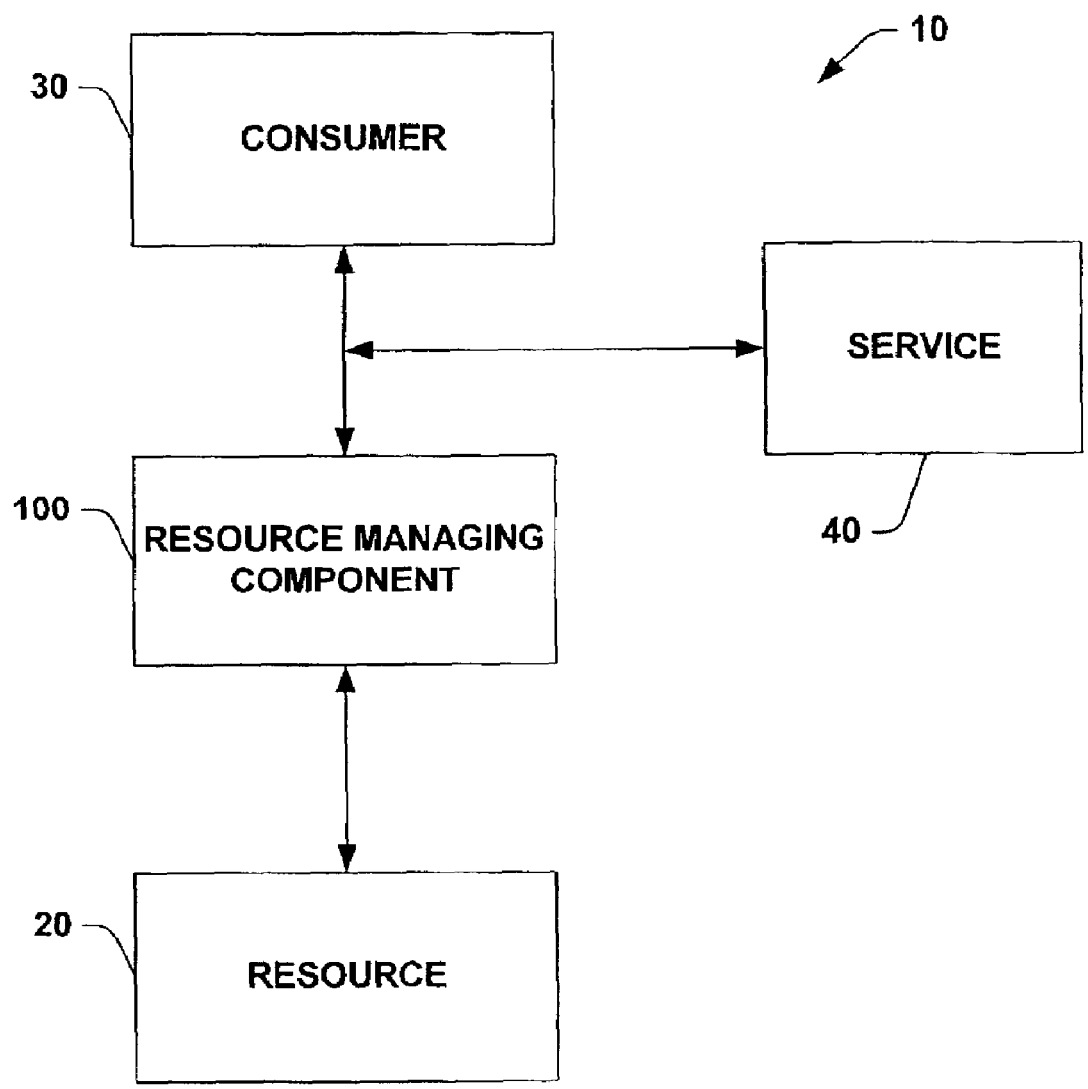
FIG. 1 is schematic block diagram illustrating a system for pre-allocating resources for use by a registering consumer, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, to one skilled in the art that the present invention may be practiced without these specific details In other instances, well-known structures and devices are shown in block diagram form in order to facilitate description of the present invention.

As used in this application, the term "component" is intended to refer to a computer-related entity; either hardware, a combination of hardware and software, software, or software in execution. For example, a component may be, but is not limited to being, a process, a process running on a processor, a processor, an object, an executable, a thread of execution, an executable instruction, a program and a computer. By way of illustration, both an application running on a server and the server upon which the application is running can be a component. By way of further illustration, a component can be a single machine executable instruction or a collection of machine executable instructions. One or more components can reside within one computer program, process and/or thread. By way of illustration, a computer process may be responsible for accepting a request, identifying a request and routing a request. Thus, the computer process may contain components identified as an accepting component, an identifying component and a routing component.

As used in this application, the terms "allocator", "identifier", "associator", "resource manager" and "router" are intended to refer to a computer-related entity; either hardware or a combination of hardware and software. For example, an allocator may be, but is not limited to being, a process running on a processor, a processor, an object, an executable, a thread of execution, an executable instruction, a program and a computer. By way of illustration, both an application running on a server and the server upon which the application is running can be an allocator. By way of further illustration, an allocator can be a single machine executable instruction or a collection of machine executable instructions. One or more allocators can reside within one computer program, process and/or thread.

For the purposes of this application a "registering consumer" is defined as a consumer for whom information employed in accessing an application and/or service has not been propagated to components co-operating in managing resources that are employed to support the application and/or service. Similarly, a "registered consumer" is defined as a consumer for whom information employed in accessing an application and/or service has been propagated to components co-operating in managing resources that are employed to support the application and/or service.

Referring initially to FIG. 1, a system 10 for pre-allocating a resource 20 to support a consumer 30 registering to use an application and/or service 40 (hereinafter "service") is illustrated. The resource 20 can be managed by a resource manager 100. The resource 20 can be, but is not limited to, disk space, processor cycles, communication bandwidth, display space and security devices, for example. The tasks performed by the resource manager 100 can include, but are not limited to, allocating space (space can include, but is not limited to, disk space and memory), de-allocating space, reallocating space, reclaiming space, sending data, receiving data, acquiring display space, releasing displaying space, requesting security services and requesting printing services. The service 40 can be available via a protocol that identifies a user through items including, but not limited to, a cookie or a persistent connection (e.g., the Internet). The service 40 can be, for example, an email service. Requests from the registering consumer 30 to access the service 40 over the Internet can be made, for example, by Hypertext Transfer Protocol (HTTP) requests. Although one resource 20, one consumer 30, one service 40 and one resource manager 100 are illustrated in FIG. 1, it is to be appreciated by one skilled in the art that a greater number of resources 20, consumers 30, services 40 and resource managers 100 can be employed, in accordance with the present invention. Information collected from the registering consumer during the registration process can be stored in and/or by the component managing the pre-allocated resources, and can selectively be stored in a component for distinguishing requests from registering consumers. The information collected from a registering consumer can be employed to generate data associated with the registering consumer. For example, a (username, password) combination can be employed to generate a security identifier for the registering consumer.

Conventionally, the resource 20 may not be allocated for access by the consumer 30 until after the consumer 30 has registered to use the service 40. Thus, there can be a delay in registering the consumer 30 while the resource manager 100 locates a resource 20 that can be allocated to the consumer 30. If more than one resource managers 100 are cooperating in managing the resource 20, then there can be a delay between the point in time at which the consumer 30 registers to use the service 40 and the point in time at which the consumer 30 is allowed to use the service 40. The delay can be referred to as a distribution latency problem. Until information and/or generated data concerning the consumer 30 is replicated to the resource managers 100 cooperating in managing the resource 20, requests from the registering consumer 30 that would require access to the resource 20 may not be handled properly by resource managers 100 to which the information and/or generated data has not been replicated.

Thus, in the present invention, the resource manager 100 can have one or more resources 20 that are pre-allocated to support a registering consumer 30. Thus, the search for a resource 20 to allocate to support a registering consumer 30 is simplified. Such pre-allocation can reduce delays associated with allocating a resource 20 to a registering consumer 30. Further, in the present invention, the resource manager 100 can be programmed to accept requests from a registering consumer 30 that requires access to a resource 20. Similarly, if more than one resource managers 100 are cooperating in managing the resource 20, the present invention can route requests from a registering consumer 30 that requires access to a resource 20 to a resource manager 100, to which information and/or generated data associated with the request from the registering consumer 30 has been replicated. Thus, problems associated with replication latencies can be mitigated.

Figure 2:
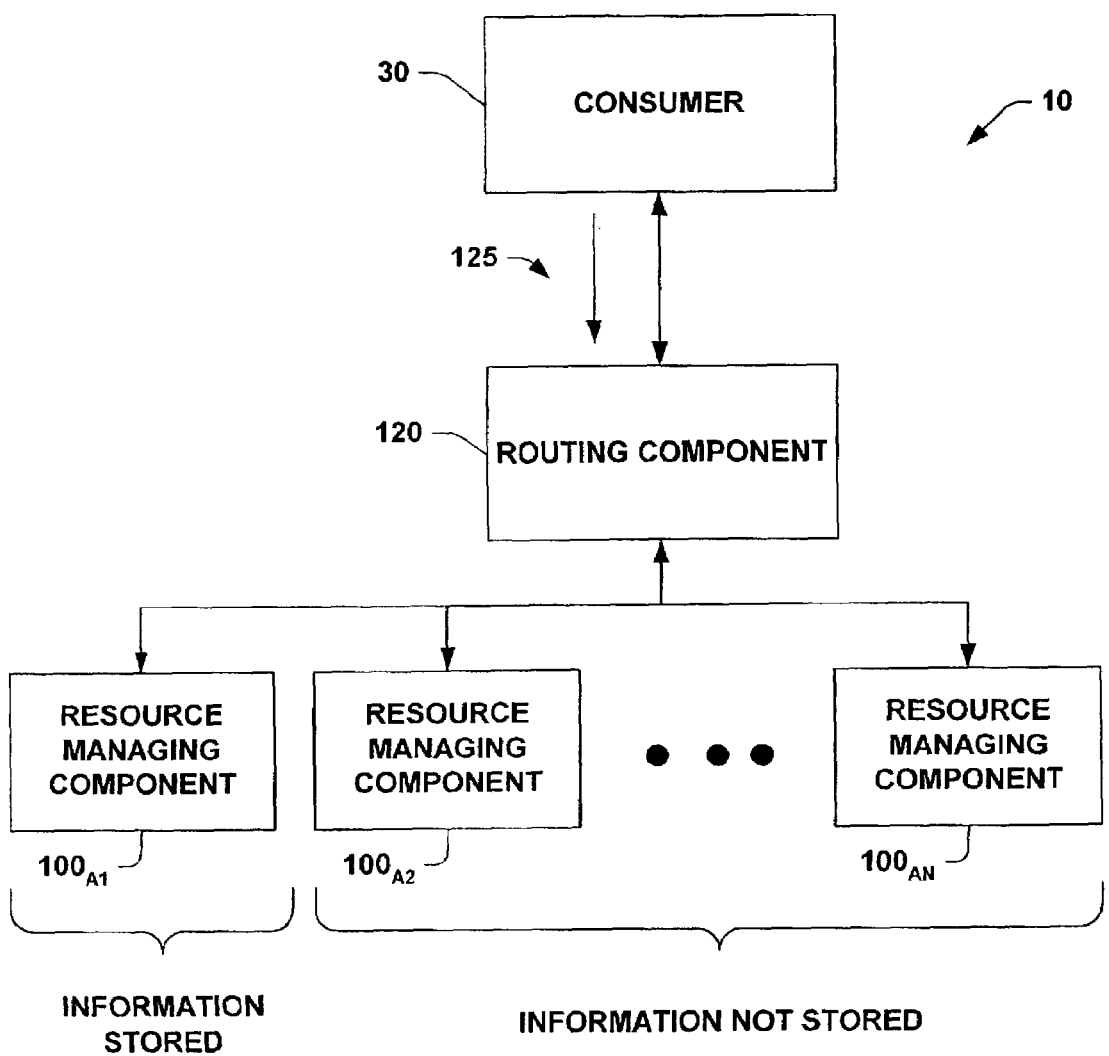
FIG. 2 is a schematic block diagram illustrating a system for processing requests from a registering consumer, in accordance with an aspect of the present invention.

Turning now to FIG. 2, the system 10 is further illustrated to include a request router 120 operable to route a request 125 from a registering consumer 30 to resource managers $100_{A1}$, $100_{A2}$, through $100_{AN}$ (collectively the resource managers 100A) is illustrated. The registering consumer 30 can generate the request 125 to access a service 40 (FIG. 1) that requires accessing a resource 20 (FIG. 1). As described above, in connection with FIG. 1, information and/or generated data associated with the registering consumer 30 can be stored initially on a first resource manager, for example $100_{A1}$. The information and/or generated data can also be replicated to the other resource managers 100A cooperating in managing one or more resources 20 (FIG. 1). Thus, to avoid having the request 125 arrive at one of the resource managers 100A to which the information and/or generated data has not been replicated, the router 120 can examine the request 125 as it arrives from the registering consumer 30 and determine to which of the resource managers 100A the request 125 should be routed.

For example, at a time $T_1$, if the information and/or generated data has been stored initially at the resource manager $100_{A1}$, but has not been replicated to any of the other resource managers 100A, then the router 120 would route the request 125 to the resource manager $100_{A1}$. But at a later point time $T_2$, if the information and/or generated data has been stored in the resource managers 100A, then the router 120 may route the request 125 to the resource managers 100A. The router 120 may route the request 125 using algorithms including, but not limited to, most frequently used managing component, least frequently used managing component, load balancing between managing components, most recently used managing component and least frequently used managing component. Routing the request 125 may involve accessing one or more tables, and/or databases, for example. By way of illustration, the router 120 may perform a table lookup to determine to which managing components the request 125 can be routed, and then apply an algorithm to determine which of the possible managing components should receive the request 125.

Figure 3:
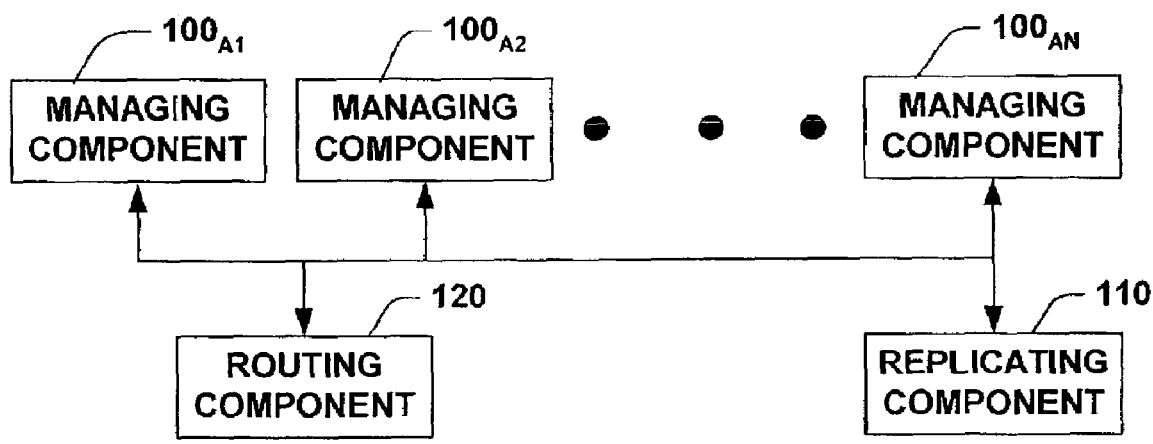
FIG. 3 is a schematic block diagram illustrating a system for replicating registration information and/or generated data from a registering consumer, in accordance with an aspect of the present invention.

Turning now to FIG. 3, a schematic block diagram illustrates a replicator 110 employed in replicating information and/or generated data associated with a registering consumer 30 (FIG. 1). The replicator 110 can also be employed in updating the router 120, and/or information, and/or data stored in and/or by the router 120.

When a registering consumer 30 (FIG. 1) accesses a service 40 (FIG. 1), information and/or generated data concerning the registering consumer 30 may be stored, for example, in a resource manager $100_{A1}$ and/or in one or more data structures associated with the resource manager $100_{A1}$. It is to be appreciated by one skilled in the art that such data structures can include, but are not limited to, a table, an array, a list, a tree, a linked list, a hash and a heap. Alternatively, and/or additionally, the information and/or generated data can be stored in a database.

More than one resource managing component (e.g. $100_{A1}$, $100_{A2}$, ... $100_{AN}$) (collectively the resource managers 100A) may be employed to manage one or more resources 20 (FIG. 1). Thus, to facilitate multiple resource managers 100A managing the one or more resources 20 (FIG. 1), the information and/or generated data concerning a registering consumer 30 (FIG. 1) of the service 40 (FIG. 1) may be replicated to the resource managers 100A by a replicator 110. But such replication may not take place before the registering consumer 30 (FIG. 1) attempts to access the service 40 (FIG. 1). Conventionally, a request from the registering consumer 30 (FIG. 1) could arrive at one of the resource managers 100A to which the information and/or generated data associated with the registering consumer 30 (FIG. 1) has not been replicated, and thus the request could fail. This can be referred to as a "replication latency problem".

Thus, in the present invention, in addition to the replicator 110 replicating information and/or generated data to the resource managers 100A, the replicator 110 can update the router 120 and/or information and/or data stored in and/or by the router 120 concerning which of the replicators 110 have received the information and/or generated data associated with a registering consumer 30. The update can be, but is not limited to, data, a signal, and/or an interrupt, for example. It is to be appreciated by one skilled in the art that although data, a signal and an interrupt are described above in association with FIG. 3, that any suitable updating means can be employed in accordance with the present invention. Updating the router 120 can mitigate replication latency problems. For example, if the router 120 has been updated to indicate that resource managers $100_{A1}$ and $100_{A2}$ have received the information and/ar generated data, then the request 125 (FIG. 2) from the registering consumer 30 (FIG. 1) can be routed to either managing component $100_{A1}$ or $100_{A2}$. But the request 125 (FIG. 2) could not be routed to resource managers $100_{A3}$ through $100_{AN}$, which had not yet received the information and/or generated data.

Figure 4:
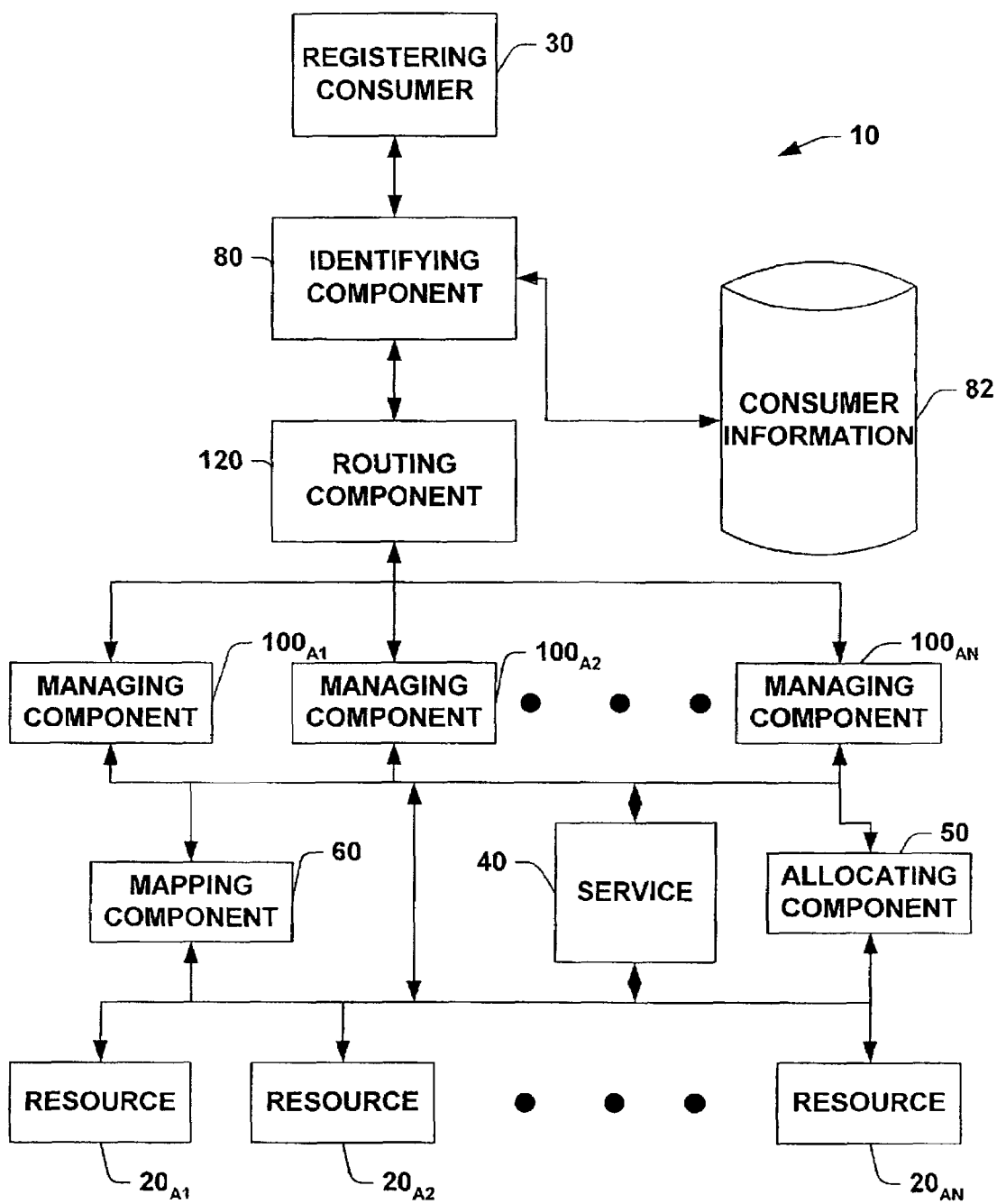
FIG. 4 is a schematic block diagram illustrating a system for pre-allocating resources for a registering consumer and for processing requests from registering and registered consumers, in accordance with an aspect of the present invention.

Turning now to FIG. 4, a schematic block diagram illustrates a system 10 for pre-allocating one or more resources $20_{A1}$, $20_{A2}$ through $20_{AN}$, (collectively 20A) to reduce delays for registering a registering consumer 30 to use a service 40. The system 10 includes an allocator 50 for pre-allocating one or more of the resources 20A. A resource $20_{A1}$ that is pre-allocated for use by a registering consumer 30 can be mapped by a mapper 60 to a resource manager $100_{A1}$ for example, that will manage the resource $20_{A1}$ for the registering consumer 30. It is to be appreciated by one skilled in the art that while the resource manager $100_{A1}$ is described as managing the pre-allocated resources, other resource managers 100A could function as the resource manager for a registering consumer 30. Further, a first resource manager $100_{A1}$ could function as the resource manager for a first registering consumer 30 while a second resource manager $100_{A2}$ could function as the resource manager for the pre-allocated resources for a second registering consumer 30. The mapping may be carried out, for example, by establishing edges on a graph representing the resources 20A, the resource managers 100A and one or more registering consumers 30. By way of further illustration, relational database tables facilitating query lookups of links between the resources 20A, the resource managers 100A and one or more registering consumers 30 can be established.

When the registering consumer 30 makes a request to access the service 40 that requires access to the resource $20_{A1}$, an identifier 80 will determine that the consumer 30 is in fact a registering consumer and pass the request to a router 120 for routing to the resource manager $100_{A1}$ that is associated with the resource $20_{A1}$ for the registering consumer 30. The identifier 80 may access a consumer information data source 82 to facilitate determining whether a consumer is a registering consumer. The consumer information data source 82 can include data stored in one or more data structures, the data structures including, but not limited to, a table, an array, a list, a tree, a linked list, a hash and a heap. The identifier 80 may examine information associated with a persistent client side hypertext file (a "cookie") associated with the consumer making the request to determine whether the consumer is a registering consumer or a registered consumer. The consumer information data store 82 may, therefore, contain information that can be employed in examining cookies to facilitate determining whether a consumer is a registering consumer or a registered consumer. For example, the consumer information data store 82 can include a list of identifiers associated with consumer cookies. The router 120, after it has been updated by the replicator 110 (FIG. 3) to indicate that information and/or generated data associated with the registering consumer 30 has been replicated to the resource managers 100A, can update the consumer information data store 82 to indicate that a registering consumer should thereafter be considered to be a registered consumer. Thus, subsequent requests from the consumer 30 can be considered to be from a registered consumer rather than from a registering consumer.

Figure 5:
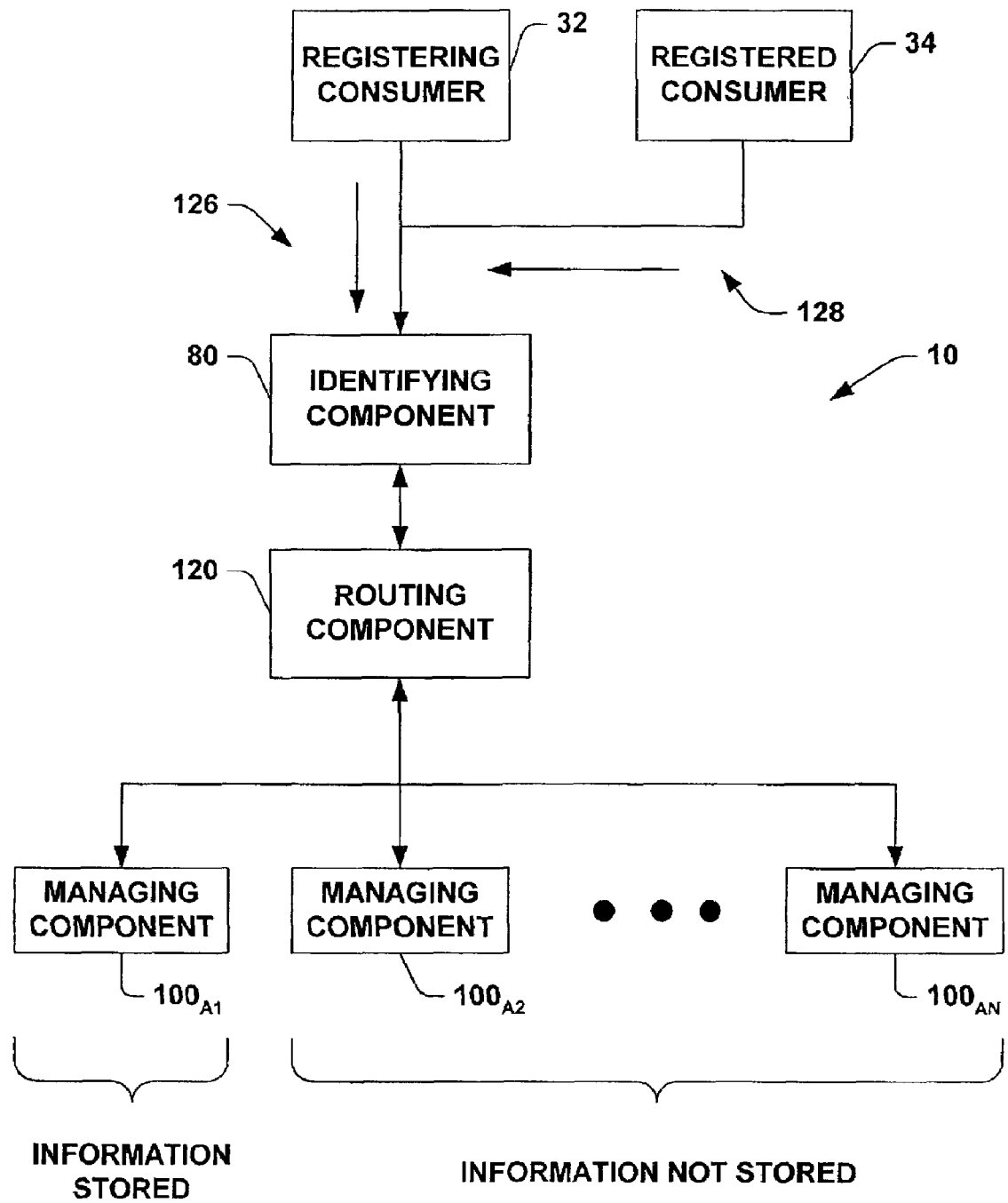
FIG. 5 is a schematic block diagram illustrating a system for mapping requests from registering and registered consumers to resource managing components, in accordance with an aspect of the present invention.

Turning now to FIG. 5, a schematic block diagram illustrates an identifier 80 and a router 120 cooperating to route a request 126 from a registering consumer 32 to a resource manager $100_{A1}$ and to route a request 128 from a registered consumer 34 to the resource managers 100A. The registering consumer 32 can generate the request 126 to access a service 40 (FIG. 1). The request 126 may be, for example, an HTTP request. The request 126 may originate from an Internet browser (e.g., Internet Explorer) session, and be intended to read an email message in an email folder provided by an email application available over the Internet. The identifier 80 can accept the request 126, examine the request 126 and pass the request 126 to the router 120. The examination by the identifier 80 and processing performed by the router 120 can route the request 126 to the resource manager $100_{A1}$ that has been tasked with handling requests from the registering consumer 32. Since it has been tasked with handling requests from a registering consumer 32, the resource manager $100_{A1}$ may be associated with a pre-allocated resource $20_{A1}$. Having the pre-allocated resource $20_{A1}$ available can reduce delays in allocating resources for the registering consumer 32. For example, rather than experiencing delays associated with searching for and allocating resources to a registering consumer after the registering consumer registers to access an application, the present invention reduces such delays by pre-allocating one or more resources for registering consumers. By way of illustration, a user registering to access an email application may require disk space, data communications bandwidth, and access to security devices. Conventionally, such resources may be allocated after receiving a request from a consumer to register for access to the application. The present invention can pre-allocate such resources so that they are available for the registering consumer contemporaneously with the registering consumer's registering for access to the application. Further, the ability to route the request 126 to a resource manager capable of handling the request mitigates problems associated with requests arriving at resource managing components that cannot handle such requests due, for example, to replication latency problems are mitigated.

Similarly, a registered consumer 34 can generate a request 128 to access a service 40 (FIG. 1). The request 128 may be, for example, an HTTP request. The identifier 80 can accept the request 128, examine the request 128 and pass the request 128 to the router 120. The examination by the identifier 80 and processing performed by the router 120 may route the request 128 to one of the resource managers 100A that can access a resource and to which information and/or generated data associated with the registered consumer 34 has been replicated.

The pre-allocated resource $20_{A1}$ is illustrated as being associated with the resource manager $100_{A1}$. It is to be appreciated by one skilled in the art that a second pre-allocated resource $20_{A2}$ may be pre-allocated for use by a registering consumer and thus may be associated with the resource manager $100_{A2}$, for example. Thus, the processing load associated with managing pre-allocated resources and requests associated with registering consumers can be distributed over more than one resource manager. Thus, problems associated with replication latency problems are further mitigated.

The router 120 can employ different routing algorithms when routing requests to the resource managers 100A. For example, the router 120 can employ algorithms including, but not limited to, routing to the most frequently used resource managing component, routing to the least frequently used resource managing component, routing to the most recently used resource managing component, routing to the resource managing component to which a request has not been routed for the greatest period of time and routing to resource managing components in a round-robin fashion.

Although five algorithms are described above, it is to be appreciated by one skilled in the art that a greater or lesser number of routing algorithms may be employed in accordance with the present invention.

Figure 6:
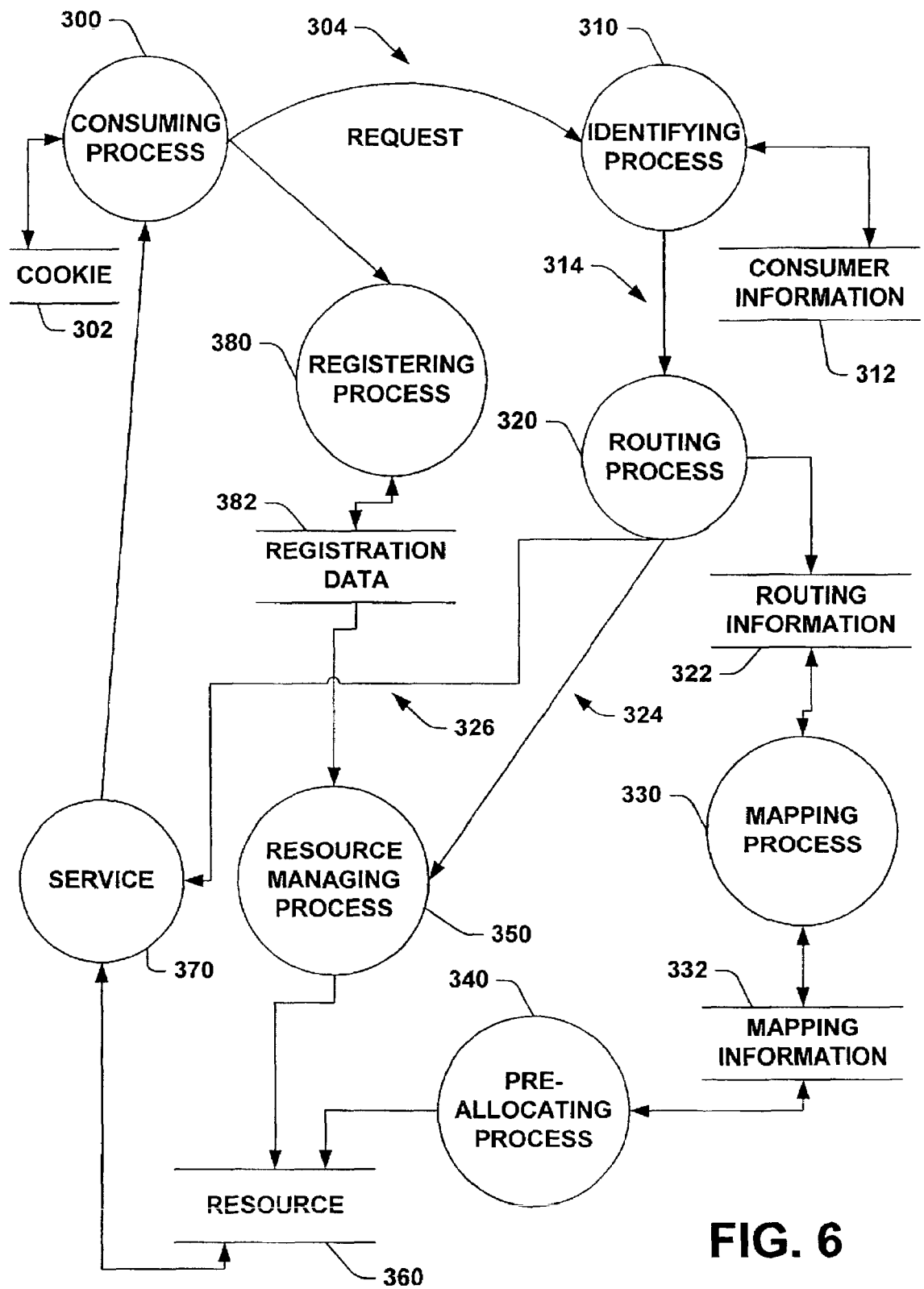
FIG. 6 is a data flow diagram illustrating a sample data flow through an exemplary aspect of the present invention.

Turning now to FIG. 6, a sample data flow through an exemplary aspect of the present invention is illustrated. A consuming process 300 can generate a request 304 that is transmitted to an identifying process 310. The consuming process 300 can have information about the consuming process 300 stored in a persistent client-side hypertext file (cookie) data store 302. The data store 302 can include information that can be employed to identify whether the consuming process 300 should be considered a registering consuming process or a registered consuming process. For example, the data store 302 can contain a binary flag, or a bit field, for example, indicating whether the consuming process is registering or registered. To facilitate registering a consuming process 300, a registering process 380 can collect registration information, including, but not limited to, username, browser preference, time zone preference, language preference, disk space requirements, communication bandwidth requirements, security requirements and password. The registering process 380 can process the registration information and deposit the registration information and/or data generated from the registration information in a registration data store 382. For example, a security identifier can be generated from a registration (username, password) combination. One or more pieces of information and/or generated data stored in the registration data store 382 will be stored initially in a resource managing process 350 associated with one or more pre-allocated resources and tasked with processing requests from one or more registering consuming processes. One or more pieces of information and/or generated data stored in the registration data store 382 will be propagated to data stores associated with the resource managing processes 350. For example, data including, but not limited to, the username, password, security identifier and allocation mapping can be replicated to the data stores associated with the resource managing processes 350.

The identifying process 310 accepts the request 304 and determines whether the request 304 is from a registered consuming process or a registering consumer process. The identifying process 310 can access a consumer information data store 312 to facilitate determining whether the request is from a registered or a registering consuming process. The consumer information data store 312 can include, for example, a list of registered consuming processes and a list of registering consumer processes. The identifying process 310 may modify the request 304 and pass the modified request 314, which may be identical to the unmodified request 304, to a routing process 320.

The routing process 320 is responsible for passing the request 314 and/or a modified version 324 of the request 314 to a resource managing process 350 that is capable of handling the request 314. The routing process 320 may, therefore, access a routing information data store 322 to facilitate locating a resource managing process 350 capable of handling the request 314. The routing information data store 322 can include mapping information to facilitate determining which resource managing process 350, if any, is capable of handling the request 314. For a registering consuming process, the routing information data store 322 should contain a mapping to a resource managing process 350 associated with one or more pre-allocated resources. For a registered consuming process, the routing information data store 322 should contain one or more mappings to one or more resource managing processes 350 to which information and/or generated data in the registration data store 382 has been replicated. The routing process 320 may modify the request 314 and send a modified request 324, which may be identical to the request 314, to the resource managing process 350.

The resource managing process 350 can be associated with one or more resources, data concerning such resources being stored in a resource data store 360. A pre-allocating process 340 may have pre-allocated the one or more resources and stored information about the one or more pre-allocated resources in the resource data store 360. The pre-allocating process 340 can share information about the one or more pre-allocated resources with a mapping process 330, through a mapping information data store 332. The mapping information data store 332 can contain information concerning which resources were pre-allocated and to which resource managing process 350 the pre-allocated resources were assigned. By way of illustration, the mapping information data store 332 can contain information concerning communications bandwidth available on an Internet connection and a data communications device assigned to utilize that available bandwidth. Thus, the mapping process 330 can update the routing information data store 322 with information concerning resource managing processes 350 and associated pre-allocated resources.

The routing process 320 can also modify the request 314 to a format suitable for processing by a service 370, and send the modified request 326, which may be identical to the request 314, to the service process 370. The request 326 may require the service process 370 to access one or more resources, information concerning which resources is stored in the resource data store 360. Thus, by facilitating sending requests to resource managing processes 350 capable of handling such requests, at least in part because they are associated with pre-allocated resources, the present invention facilitates processing requests from a registering consuming process while avoiding allocation delay problems and replication latency problems associated with conventional systems.

The service process 370 can process the request 326 and perform one or more actions based on the request 326. For example, an email application may receive a request to copy an email message from a first folder to a second folder. The application may therefore access two different disks via two different resource managing processes 350.

While eight processes and six data stores are illustrated in association with FIG. 6, it is to be appreciated by one skilled in the art that a greater or lesser number of processes and/or data stores may be employed in accordance with the present invention. It is to be further appreciated that FIG. 6 illustrates one possible data flow through an exemplary system, and that other data flows may be employed in accordance with the present invention. It is to be further appreciated that although one resource managing process 350 is illustrated, that a greater number of resource managing processes 350 can be employed in accordance with the present invention.

Figure 7:
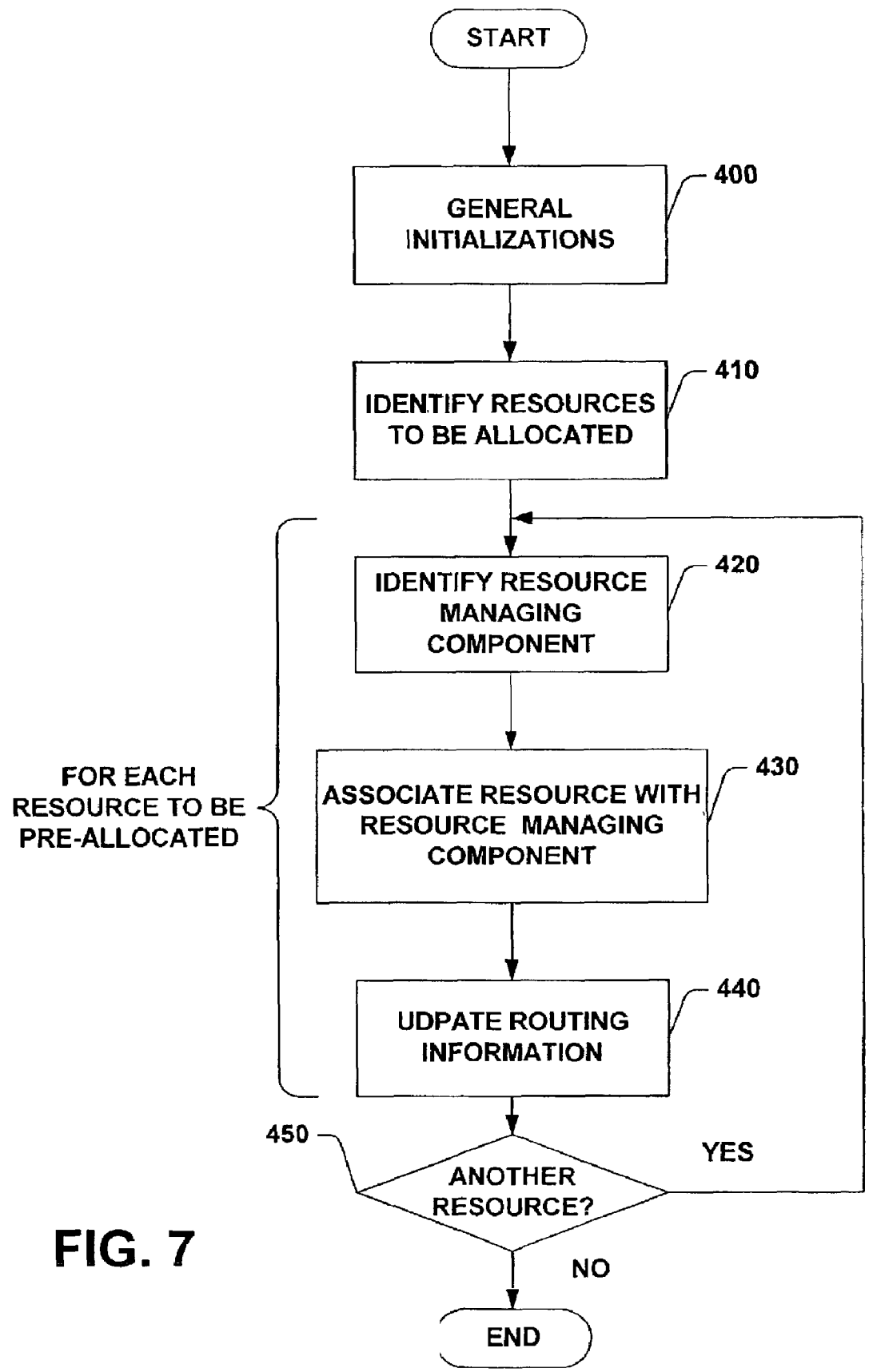
FIG. 7 is a flow chart illustrating a method for pre-allocating resources for use by registering consumers, in accordance with an aspect of the present invention.
Figure 8:
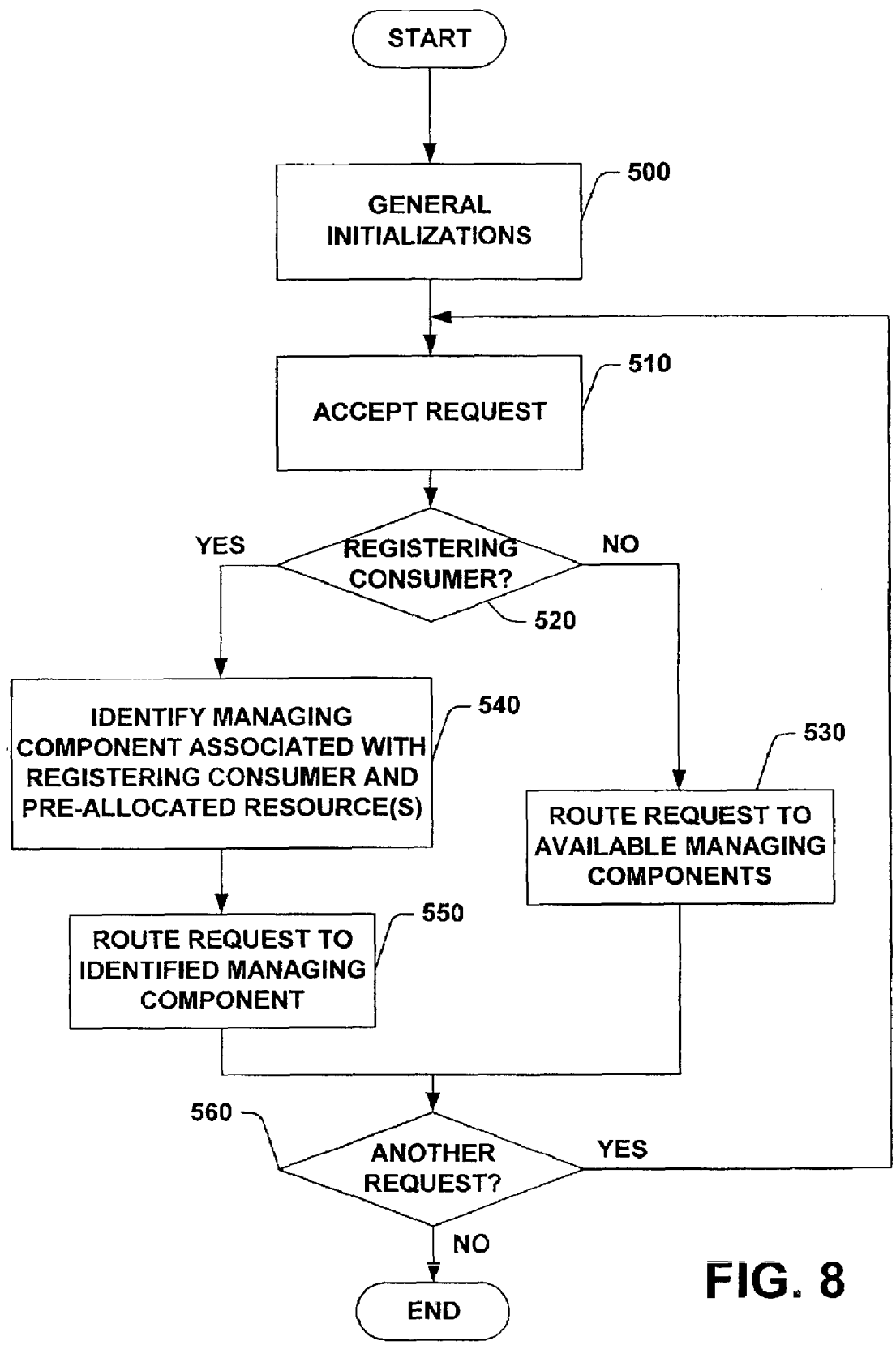
FIG. 8 is a flow chart illustrating a method for processing requests from registering and registered consumers, in accordance with an aspect of the present invention.

In view of the exemplary systems shown and described above, a methodology, which may be implemented in accordance with the present invention, will be better appreciated with reference to the flow diagrams of FIGS. 7 and 8. While, for purposes of simplicity of explanation, the methodologies of FIG. 7 and FIG. 8 are shown and described as a series of steps. It is to be understood and appreciated that the present invention is not limited by the order of the steps, as some steps may, in accordance with the present invention, occur in different orders and/or concurrently with other steps from that shown and described herein. Moreover, not all illustrated steps may be required to implement a methodology in accordance with the present invention.

Turning now to FIG. 7, a method for pre-allocating resources to reduce delays associated with registering for a service and to facilitate handling requests for registering consumers is illustrated. At step 400, general initializations are performed. The general initializations can include, but are not limited to, allocating memory for the method, acquiring resources required by the method, establishing pointers, setting variables, clearing registers and identifying operating conditions, for example. At step 410, the method identifies one or more resources to be pre-allocated. The method can identify resources including, but not limited to, memory, processor cycles, communications devices, communication bandwidth, video display and security devices, for example.

Steps 420 through 440 can be performed for each resource to be pre-allocated. At step 420, a resource managing component capable of managing the resource to be pre-allocated is identified. For example, from a pool of resource managing components, a resource managing component suitable for managing the pre-allocated resource may be selected by examining properties including but not limited to, current load, capacity, scheduled maintenance time, cost of employing the resource managing component and speed of access via the resource managing component. For example, data communications bandwidth may be pre-allocated for consumption by a consumer. Further, a data communications device (e.g., a modem) may be assigned to manage and/or consume the communications bandwidth.

At step 430, the resource managing component identified at step 420 can be associated with the resource to be pre-allocated, thus effecting the pre-allocation. For example, a server can be identified as being capable of managing access to disk space to be made available to a consumer registering to use an email application. Once the resource manager is identified at step 420, managing the resource can be turned over to that resource managing component and an association between the resource managing component and the resource can be established. The association can be recorded in one or more data structures. By way of illustration, edges may be generated on a graph employed to relate resources, resource managing components and/or consumers. By way of further illustration, one or more relational database table records may be written, the records operable to produce results for queries concerning relationships between resources, resource managing components and/or consumers.

At step 440, routing information can be updated to reflect the association established in step 430. For example, routing information can be updated to indicate that the disk space is being managed by the server, and that requests that require access to the disk space are to be routed to the server. Thus, when a request arrives from a registering consumer, wherein the request requires access to disk space, the present method facilitates supplying such disk space with shorter delays than are associated with conventional systems that do not pre-allocate resources. Further, since a resource managing component has been assigned to handle requests from registering consumers that require access to the pre-allocated resource, problems associated with distribution latencies are mitigated. For example, when a request is received from a registering consumer, the request requiring access to the example disk space described above, the example server above will be tasked to process the request and manage the desired access to the disk space. Thus, problems associated with resource managing components receiving requests from registering components for which the resource managing component has no registration and/or generated data are mitigated.

At step 450, a determination is made concerning whether another resource is going to be pre-allocated. If the determination at step 450 is YES, then processing continues at step 420. Otherwise, the pre-allocating method concludes.

Turning now to FIG. 8, a method for processing requests received from registering and registered consumers is flowcharted. At step 500, general initializations are performed. The general initializations can include, but are not limited to, allocating memory for the method, acquiring resources required by the method, establishing pointers, setting variables, clearing registers, testing data communications devices and/or channels, testing security processes and identifying operating conditions, for example. At step 510, a request is received from a consumer. The request may be, for example, an HTTP request from a browser employed by the consumer. The request may seek access to a stock quote service, for example. Such a request may require accessing a stock ticker resource and a data communications resource. Although HTTP requests are described throughout this application, it is to be appreciated by one skilled in the art that requests can be conveyed to the present invention by any suitable data communications protocol and/or method.

At step 520, a determination is made concerning whether the request is from a registering consumer. Such a determination can be made by examining data associated with a persistent client-side hypertext file (a cookie), for example. Although examining cookies has been described throughout the application as one means for determining whether a request is from a registering consumer or a registered consumer, it is to be appreciated by one skilled in the art that any suitable means for determining whether a request is from a registering or registered consumer can be employed by the present invention. For example, methods including, but not limited to, examining relationships between data communications channels and consumers, assigning and examining globally unique identifiers and assigning and examining (username, password) combinations can be employed.

If the determination at step 530 is NO, that the request is not from a registering consumer, that the request is from a registered consumer, then at step 530, the request can be routed to a resource managing component capable of handling the resource access associated with the request. For example, a first request from a first registered consumer that requires access to a data encryption device can be routed to a first resource managing component while a second request from a first registered consumer that requires access to a data encryption device can be routed to a second resource managing component. The example is intended to illustrate that once a consumer is a registered consumer, that resource management components other than the resource management component initially assigned to manage a pre-allocated resource can handle requests for resources from the registered consumer. Algorithms including, but not limited to, routing to the most frequently used resource managing component, routing to the least frequently used resource managing component, routing to the most recently used resource managing component, routing to the resource managing component to which a request has not been routed for the greatest period of time and routing to resource managing components in a round-robin fashion can be employed in accordance with the present invention. Although five algorithms are described above, it is to be appreciated by one skilled in the art that a greater or lesser number of routing algorithms may be employed in accordance with the present invention.

If the determination at step 520 is YES, that the request is from a registered consumer, then at step 540, the managing component associated with managing one or more pre-allocated resources for the registering component is identified. For example, data structures including, but not limited to, a routing table, a mapping table, an association list and a mapping list can be examined to identify the resource managing component tasked with managing one or more pre-allocated resources for a registering consumer. At step 550, the request from the registering consumer can be routed to the resource managing component identified at step 540.

At step 560, a determination is made concerning whether the method is going to accept further requests. If the determination at step 560 is YES, then processing continues at step 510, otherwise processing concludes.

Figure 9:
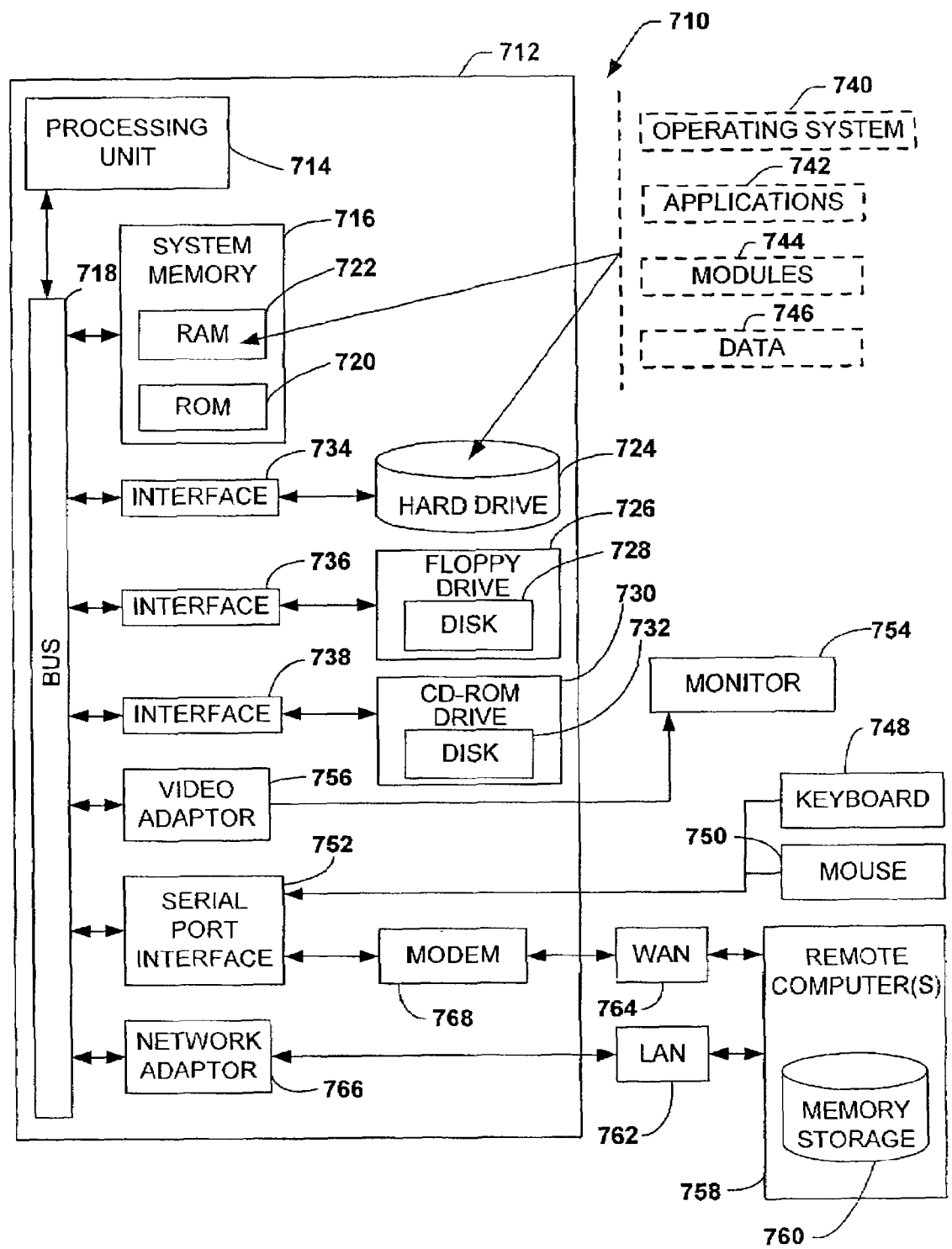
FIG. 9 is a schematic block diagram of an exemplary operating environment for a system configured, in accordance with the present invention.

In order to provide additional context for various aspects of the present invention, FIG. 9 and the following discussion are intended to provide a brief, general description of a suitable computing environment 710 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

It is to be appreciated that various aspects of the present invention may employ technologies associated with facilitating unconstrained optimization and/or minimization of error costs. Thus, non-linear training systems/methodologies (e.g. back propagation, Bayesian, fuzzy sets, non-linear regression, or other neural networking paradigms including mixture of experts, cerebella model arithmetic computer (CMACS), radial basis functions, directed search networks and function link networks may be employed.

With reference to FIG. 9, an exemplary environment 710 for implementing various aspects of the invention includes a computer 712, including a processing unit 714, a system memory 716 and a system bus 718 that couples various system components including the system memory to the processing unit 714. The processing unit 714 may be any of various commercially available processors. Dual microprocessors and other multi-processor architectures also can be used as the processing unit 714.

The system bus 718 may be any of several types of bus structure including a memory bus or memory controller, a peripheral bus, and a local bus using any of a variety of commercially available bus architectures. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736 and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program non-interrupt data 746. The operating system 740 can be any of a variety of commercially available operating systems.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance, a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for pre-allocating at least one resource, comprising:

an allocator that pre-allocates the at least one resource based at least in part on an association between the at least one resource and a first resource manager, a resource capacity and a resource location, the first resource manager is one of a plurality of collaborating resource managers that manage the at least one resource;

an identifier that determines whether a consumer utilizing the at least one resource is a registering consumer or a registered consumer;

an associator that associates the at least one pre-allocated resource with the first resource manager, the first resource manager operable to manage the at least one pre-allocated resource for the registering consumer;

a router that routes a request requiring access to the at least one resource associated with the registering consumer to the first resource manager, the router utilizes an algorithm to route the request to the first resource manager, the algorithm includes routing the request in a round-robin fashion to each of the collaborating resource managers based on an analysis of the request and mapping information that identifies which of the plurality of collaborating resource managers received replicated information and generated data associated with the registering consumer, wherein the request will not be routed to the plurality of collaborating resource managers that have not received replicated information and generated data associated with the registering consumer; and a replicator that propagates information and generated data associated with the registering consumer to a disparate plurality of resource managers collaborating in managing the at least one resource and the router.

2. The system of claim 1, the at least one resource is allocated to a consumer registering to use an application.

3. The system of claim 2, the application is available over a network.

4. The system of claim 3, the network is the Internet.

5. The system of claim 1, the at least one resource is allocated to a consumer registering to use a service.

6. The system of claim 5, the service is available over the Internet.

7. The system of claim 1, the identifier is a computer process.

8. The system of claim 1, the associator is a computer process.

9. The system of claim 1, the router is a computer process.

10. The system of claim 1, the identifier operable to receive Hypertext Transfer Protocol (HTTP) requests.

11. The system of claim 10, the identifier distinguishes consumer requests by examining at least part of a persistent client side hypertext file (cookie).

12. The system of claim 1, the associator records association information concerning an association between the at least one resource and the first resource manager in one or more data structures.

13. The system of claim 12, the one or more data structures include at least one of, a table, an array, a list, a tree, a linked list, a hash and a heap.

14. The system of claim 12, the one or more data structures contain a mapping between the at least one resource and the first resource manager.

15. The system of claim 1, the associator records association information concerning an association between the at least one resource and the first resource manager in one or more databases.

16. The system of claim 15, the one or more databases contain a mapping between the at least one resource and the first resource manager.

17. The system of claim 1, the router accesses one or more data structures containing routing information that facilitates routing the request associated with the registering consumer to the first resource manager.

18. The system of claim 17, the one or more data structures include at least one of, a table, an array, a list, a tree, a linked list, a hash and a heap.

19. The system of claim 18, the one or more data structures contain one or more mappings for one or more consumers to one or more resource managers.

20. The system of claim 1, the router accesses one or more databases containing information that facilitates routing the request associated with the registering consumer to the first resource manager.

21. The system of claim 20, the one or more databases contain one or more mappings for one or more consumers to one or more resource managers.

22. A method for processing requests from a registering consumer, comprising:
pre-allocating one or more resources for one or more registering consumers based on resource type, resource location, resource capacity, resource availability and an association between the one or more resources and a first resource managing component that comprises one of a plurality of collaborating resource managers that manage the at least one resource;
determining whether data concerning the registering consumer has been replicated to a plurality of disparate resource managing components collaborating in managing the at least one resource;
associating one or more of the pre-allocated resources with the first resource managing component, the first resource managing component operable to manage the one or more pre-allocated resources for the registering consumer;
associating the registering consumer with the first resource managing component; and
routing a request from the registering consumer that requires access to a resource to the first resource managing component, the routing utilizes a round robin algorithm to direct the request to each of the plurality of collaborating resource managers based on an analysis of the request and mapping information that identifies which of the plurality of collaborating resource managers received replicated information and generated data associated with the registering consumer, wherein the request will not be routed to the plurality of collaborating resource managers that have not received replicated information and generated data associated with the registering consumer.

23. The method of claim 22, data associated with a registering consumer is replicated to one or more resource managers.

24. The method of claim 22, the request requiring access to the resource is not necessarily routed to the first resource manager if the data associated with registering consumer has been replicated to one or more resource managers, the request being routable to the one or more resource managers to which the data has been replicated.

25. The method of claim 22, the request requiring access to the resource is an HTTP request.

26. The method of claim 22, the registering consumer is registering to use at least one of an application and a service.

27. The method of claim 26, the application being available over the Internet.

28. The method of claim 26, the service being available over the Internet.

29. A computer readable medium having stored thereon computer executable instructions for carrying out the method of claim 22.

30. A system for pre-allocating at least one resource, comprising:
means for pre-allocating the at least one resource for consumption by a consumer based at least in part on a resource type, a resource capacity, a resource location, a resource availability and an association between the one or more resources and a first resource managing component that comprises one of a plurality of collaborating resource managers that manage the at least one resource;
means for determining whether data concerning the consumer has been replicated to one or more resource managing components collaborating in managing the at least one resource;
means for associating the at least one pre-allocated resource with a first resource managing component that acts in collaboration with a plurality of resource managing components, where the first resource managing component manages the at least one pre-allocated resource for the consumer before the data concerning the consumer has been replicated to the one or more resource managing components; and
means for routing a request generated by the consumer, for whom data has not been replicated to the one or more resource managing components, to the first resource managing component based on utilization of a round robin routing algorithm, an analysis of the request and mapping information that identifies which of the plurality of collaborating resource managers received replicated information and generated data associated with the registering consumer, wherein the request will not be routed to the plurality of collaborating resource managers that have not received replicated information and generated data associated with the registering consumer.

* * * * *